US00RE39666E

(19) United States
(12) Reissued Patent
Walsh et al.

(10) Patent Number: US RE39,666 E
(45) Date of Reissued Patent: May 29, 2007

(54) SOFT COUNT TRACKING SYSTEM

(75) Inventors: Michael Walsh, Patchogue, NY (US); Miroslaw Blasczec, Lindenhurst, NY (US); Salvatore Soriano, West Islip, NY (US); William Wood, Hot Springs, AR (US)

(73) Assignee: Global Payment Technologies, Inc., Hauppauge, NY (US)

(21) Appl. No.: 10/341,317

(22) Filed: Jan. 13, 2003

Related U.S. Patent Documents

Reissue of:
(64) Patent No.: 5,630,755
Issued: May 20, 1997
Appl. No.: 08/418,556
Filed: Apr. 7, 1995

U.S. Applications:
(

(63) Continuation of application No. 09/313,335, filed on May 20, 1999, now abandoned.

(51) Int. Cl.
*A63F 9/24* (2006.01)

(52) U.S. Cl. ..... 463/25; 700/91
(58) Field of Classification Search ..... 463/1, 463/25–29, 40–42; 700/91–63, 231–236; 194/200, 216–17; 340/5.9
See application file for complete search history.

(56) References Cited

U.S. PATENT DOCUMENTS

| | | | | |
|---|---|---|---|---|
| 4,072,930 A | | 2/1978 | Lucero et al. | 340/152 |
| 4,216,461 A | | 8/1980 | Werth et al. | 340/147 |
| 4,283,709 A | | 8/1981 | Lucero et al. | 340/147 |
| 4,636,951 A | | 1/1987 | Harlick | 364/412 |
| 4,964,638 A | | 10/1990 | Ishida | 273/138 |
| 4,977,583 A | | 12/1990 | Gorgone | 377/8 |
| 5,113,990 A | * | 5/1992 | Gabrius et al. | 194/206 |
| 5,210,846 A | | 5/1993 | Lee | 395/425 |
| 5,257,179 A | | 10/1993 | DeMar | 364/410 |
| 5,290,033 A | * | 3/1994 | Bittner et al. | 463/25 |
| 5,310,035 A | | 5/1994 | Dobransky, Jr. et al. | |
| 5,398,326 A | | 3/1995 | Lee | 395/425 |
| 5,429,361 A | | 7/1995 | Raven et al. | 273/138 |
| 5,442,568 A | * | 8/1995 | Ostendorf et al. | 700/236 |
| 5,470,079 A | | 11/1995 | LeStrange et al. | 273/138 |
| 5,477,952 A | | 12/1995 | Cartellano et al. | |
| 5,557,086 A | * | 9/1996 | Schulze et al. | 235/380 |
| 5,564,545 A | * | 10/1996 | Suzuki | 194/206 |
| 5,655,961 A | * | 8/1997 | Acres et al. | 463/27 |
| 5,715,924 A | * | 2/1998 | Takemoto et al. | 194/206 |
| 5,826,680 A | * | 10/1998 | Takemoto et al. | 186/37 |
| 5,836,435 A | * | 11/1998 | Fujita et al. | 194/206 |
| 5,918,720 A | * | 7/1999 | Robinson et al. | 194/206 |

FOREIGN PATENT DOCUMENTS

| | | |
|---|---|---|
| DE | 28 22 122 A1 | 11/1979 |
| DE | 3601 157 A1 | 7/1987 |
| EP | 0307 375 A2 | 3/1989 |
| EP | 0 387 972 A1 | 9/1990 |
| GB | 2 105 892 A | 3/1983 |
| GB | 2 205 214 | 11/1988 |
| JP | HEI 5-245266 | 9/1993 |

OTHER PUBLICATIONS

*50 Ways to Touch Memory*, Dallas Semiconductor (Aug. 1994), 2 cover pages and pp. 1–45.
Dallas Semiconductor, product specification, pp. xxvi–xxix.
*Binding Digital Data TO Physical Objects*, Dallas Semiconductor, Nov. 1994, pp. 1–28.
Dallas Semiconductor, data sheet DS1992/DS1993; DS1994, Feb. 6, 1998, 20 pages.
Dallas Semiconductor, data sheet DS1990A, Feb. 6, 1998, 10 pages.
*All Silicone Networking*, Dallas Semiconductor.
PCT Search Report, Jan. 21, 1998, PCT/US97/08157.

* cited by examiner

*Primary Examiner*—Xuan M. Thai
(74) *Attorney, Agent, or Firm*—Finnegan, Henderson, Farabow, Garrett & Dunner, LLP

(57) ABSTRACT

Apparatus is disclosed systematically to extract data from operating machines of the type used in gaming establishments. Various data is required by management to maximize the operation and the profit potential of a given machine is compiled in the machine itself. The compiled data is serially transferred to a memory device via a one-wire protocol. The memory device writes the data according a defined software routine. The contents of the memory device can be transferred to a computer for subsequent manipulation and display.

26 Claims, 4 Drawing Sheets

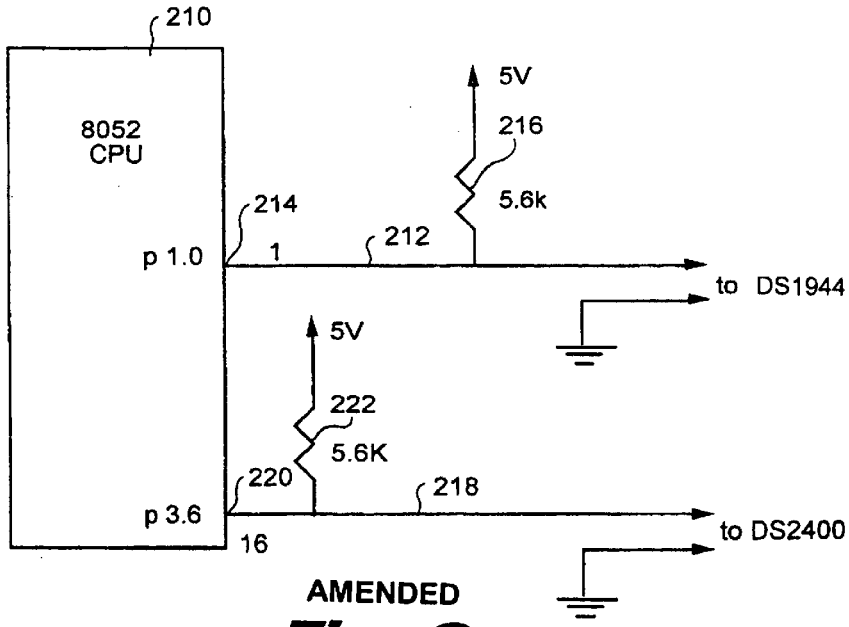
AMENDED
Fig. 2

SOFT COUNT TRACKING SYSTEM

Matter enclosed in heavy brackets [ ] appears in the original patent but forms no part of this reissue specification; matter printed in italics indicates the additions made by reissue.

*This is a continuation of application Ser. No. 09/313,335, filed May 20, 1999, now abandoned, which is a Reissue of U.S. Pat. No. 5,630,755, issued May 20, 1997, all of which are incorporated herein by reference.*

*Notice: More than one reissue application has been filed for the reissue of U.S. Pat. No. 5,630,755. The reissue applications are application Ser. No. 10/341,317 (the present application) and Ser. No. 11/166,368, which is divisional reissue of U.S. Pat. No. 5,630,755.*

FIELD OF THE INVENTION

This invention relates to a method and apparatus for the storing data of a validation system and, more particularly, to a detachable system to reliably download data from an operating machine and display the same in usable form.

BACKGROUND OF THE INVENTION

The present invention is particularly adapted for use with the validator system of a coin or currency operated gaming devices of the type used in gambling casinos or similarly large volume operations. The validator includes mechanical and electronic hardware to keep track of a given machine's operation. That is to say, each machine includes electronic hardware or mechanism that keeps track of the machine's performance, money intake, output of winnings and the like. The data that is collected and intended to be stored include such operational parameter as down time, maintenance routines, payouts, machine use (activity), faults, credit card use and the like. The problem is that at present neither the machine builders nor their customers have a simple, systematic and reliable way to retrieve the information that a given machine has compiled in its validator. In the past and in order to access the information, an employee is sent to each machine or selected machines which are then taken out of service for repair or downloading. When more than a few machines are involved (and some casinos have hundreds of machines), such past practice is expensive and error prone. Therefore, a need exists for a method and apparatus for reliably retrieving and utilizing the data compiled in a given machine.

SUMMARY OF THE INVENTION

The inventive memory management system handles a wide range of information functions. These functions are deemed necessary enhancements in the industry and provide a competitive edge over existing methods which, heretofore, are used to access data in the machine. More particularly and according to the inventive system, the enhancements are downstacked from the validator to a Dallas Semiconductor DS1990A Touch Memory Device and the Dallas Semiconductor DS2405 Addressable Switch Device. [The] *A* DS2250, in combination with the inventive software, gives the inventive system a flexible way to access machine performance. According to the inventive method, touch memory data is stored in a binary format. Memory locations of various lengths are assigned as needed for various [purposed] *purposes*.

Full details of the present invention are set forth in the following description of the invention and illustrated in the accompanying drawings.

OBJECT OF THE INVENTION

It is an object of the present invention to provide an automated means for extracting and downloading data accumulated in a machine.

It is a further object of the present invention to provide a memory management system that includes wide range of storage functions.

It is another object of the present invention to provide a means to read data stored in a machine and then communicate such data to a remote computer or laptop, whereby the data can be displayed and manipulated by this computer.

It is a another object of the present invention to provide the hardware and software for an accountability system in currency handling that is applicable to currency validators and currency stacking mechanisms.

It is a further object of the present invention to provide a soft count tracking system of closed loop design.

DESCRIPTION OF THE DRAWINGS

Other objects and features of the present invention will be apparent from the following detailed description considered in connection with the accompanying drawings. It is to be understood, however, that the drawings are designed for purposes of illustration only and not as a definition of the limits of the invention for which reference should be made to the appending claims.

In the drawings, wherein the same references numeral denotes the same element throughout the several figures:

FIG. 2 is a schematic diagram showing how a Dallas Semiconductor DS1994 and a Dallas Semiconductor DS2400 are connected to an 8052 CPU;

DETAILED DESCRIPTION OF THE INVENTION

Figure 1:
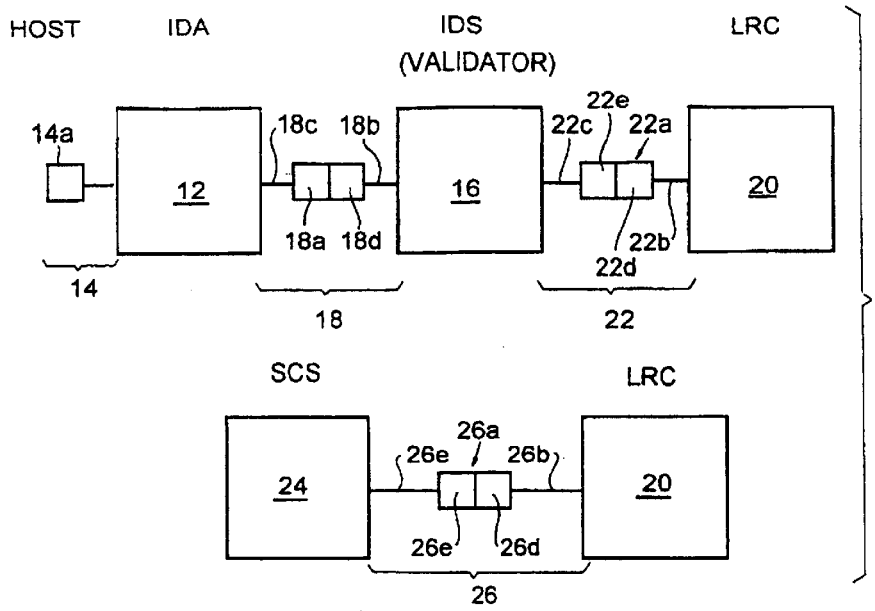
FIG. 1 is a block diagram of the inventive apparatus.
Figure 4:
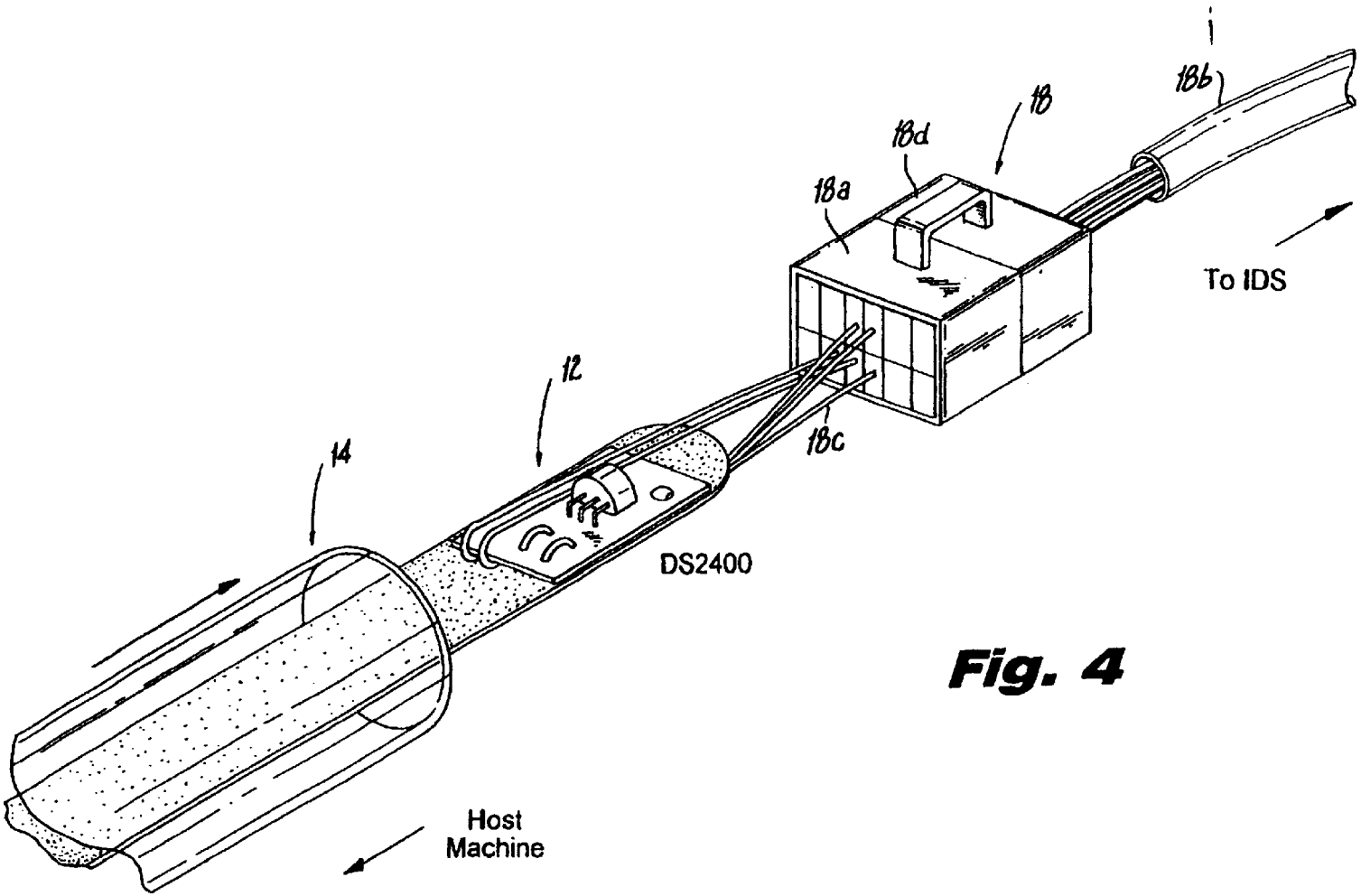
FIG. 4 is an enlarged perspective view of the detachable buss or harness used in the present system.
Figure 5:
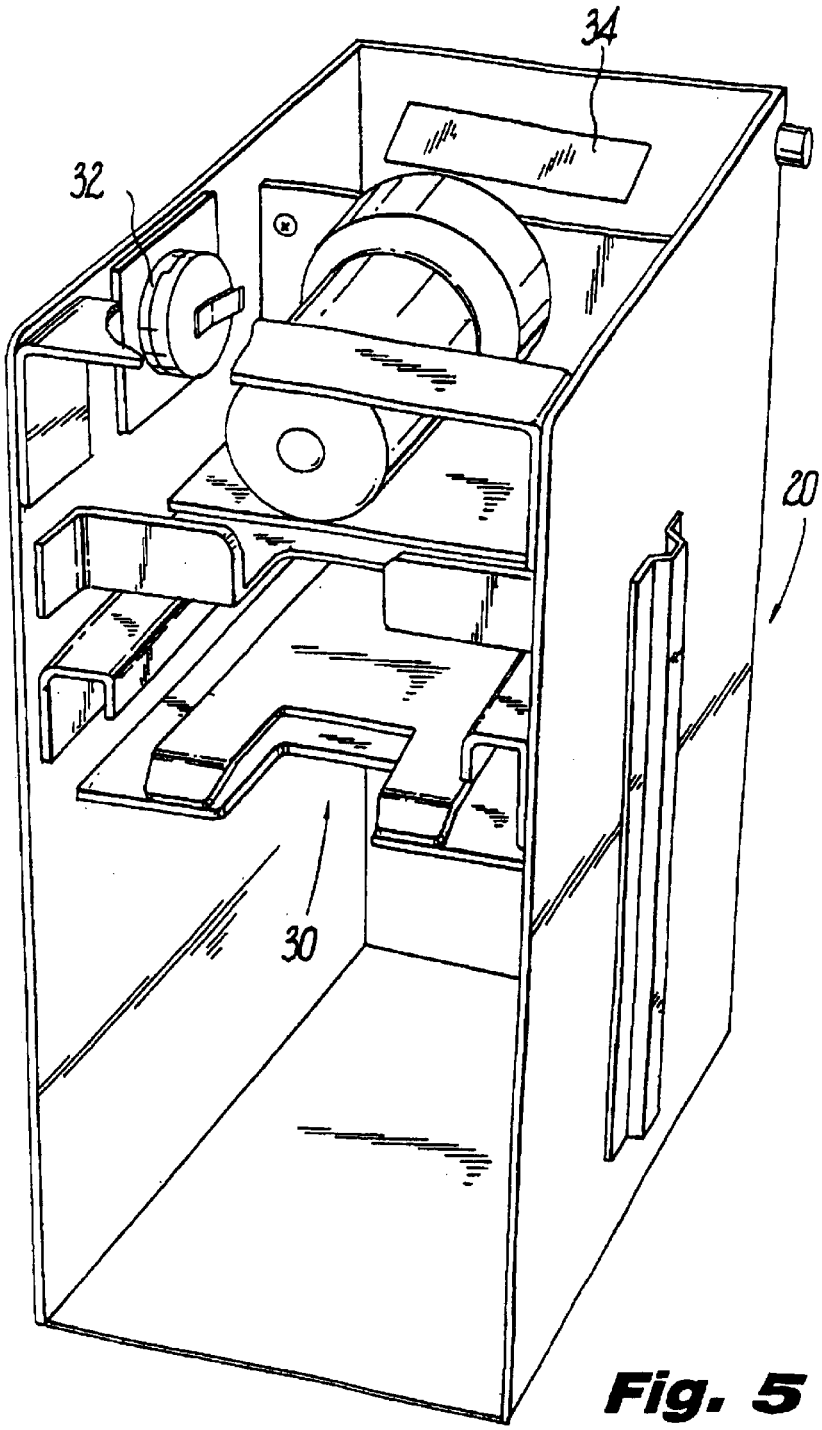
FIG. 5 is a perspective view of an LRC containing the DS1994 or DS1993 touch memory clip.

Referring now to FIG. 1, there is shown a block diagram of the inventive apparatus seen generally as reference number 10. An [indentification] *identification* system (IDS), (i.e currency validator) unit 16 acts as a downstacker for the operating machine receiving all [an] identification adaptor data generated by the IDA 12. The IDS unit contains the conventional currency sensors and detectors as well as [the] *a* CPU or computer device and display. The [IDA] *IDS unit* reads and analyzes all information including the currency value, unequal amounts, cash receipts and [effeciency] *efficiency* of the machine. The inventive system is a closed loop design for the automatic accounting of cash in gaming and other markets (machines) using coin or currency validators. In another words, the inventive system provides for an accountability routine for currency handling in currency validators and stacking mechanisms. The IDA 12 (identification adapter) is built into a wiring harness as an integral active electronic component and is provided with a unique serial number. The IDA 12 electrically communicates with one end of a harness section 14, the other end of which terminates in a host machine interface connector 14a. During use and operation, described below, connector 14a plugs into a host gaming machine, not shown, for electrical and data communication therewith. The validator or IDS unit 16, a Dallas Semiconductor DS2250, about which more is said below, is placed in electrical or data communication with IDA [adapter] 12 via a detachable buss or harness 18 shown in detail in FIG. 4. Harness 18 includes a muting or quick disconnect between the IDA 12 and the IDS or validator 16. More particularly, harness 18 comprises harness sections 18b and 18c each, on one end, respectively terminating in associated mating quick disconnect elements 18d and 18e.

IDS Unit or validator unit 16 is a currency note validator with *a* microcontroller in which the DS2250 interrogates IDA 12 for *an* identification number. IDS 16 validates notes, security papers and barcoded coupons used as money substitutes. A lockable removable cassette (LRC) 20 is placed in electrical or data communication with IDS 16 by means of a harness of harness segment 22. As with harness 18, noted above, harness 22 includes a mating or quick disconnect IDS-LRC connector 22a. More particularly, harness 22 is formed of harness buss sections 22b and 22c each, on one end, respectively terminating in associated mating quick disconnect elements 22d and 22e.

LRC 20 is a storage mechanism, such as a box or lockable container, for the secure stacking and transportation of notes and coupons. The LRC 20 is portable and designed with a stacking mechanism [34] *30* to hold the currency and notes securely once they pass through the validator. Integral to LRC 20 is a nonvolatile storage memory to receive and hold the IDA and IDS information generated by these units. The LRC is provided with a connector bus 34 for connection to a power source, motor sensors and to provide for the memory output to the CPU.

Additionally, the inventive system includes a soft count supervisor (SCS) 24 which is preferably portable or located at a remote position from the validator or [EDS] *IDS* 16. The SCS 24, about which more is said below, is detachably placed in data or electrical communication with LRC 20 by means of harness or harness segment 26. Similar to harnesses 18 and 22, harness 26 includes a mating or quick disconnect SCS-LRC connector 26a. More particularly, harness 26 is formed of harness sections 26b and 26c on one end, respectively terminating in associated detachable disconnect elements 26d and 26e. Typically, SCS 24 is a Personal computer (PC), laptop computer or handheld data storage device that, with harness 26, can be detachably coupled to LRC 20 to download data therefrom. SCS 24 interrogates the memory device within LRC 20 once the LRC is removed from the host system. The SCS provides spread sheet type accounting of notes and coupons as well as status and performance information of system components. Since the LRC is removed frequently, maintenance personnel may be directed accurately to systems performing efficiently or performing only marginally. LRC 20 may be optionally interrogated through the communication port of validator IDS 16.

Referring now to FIG. 2, there is shown in schematic form how the DS1994 and the DS2400 are electrically connected or placed in data communication with a host CPU 210. A single wire or data lead 212 is, on one end, electrically connected to data port 214 of CPU 210. The other end of wire 212 is electrically connected to Dallas Semiconductor Memory Device DS1994, as shown. Line 212 is "pulled-up" by pull-up resistor 216. A single wire or data lead 218 is, on one end, electrically connected to data port 220 of CPU 210. The other end of wire 218 is electrically connected to a Dallas Semiconductor DS2400, as shown. Wire 218 is electrically pulled-up by resistor 222.

Figure 3:
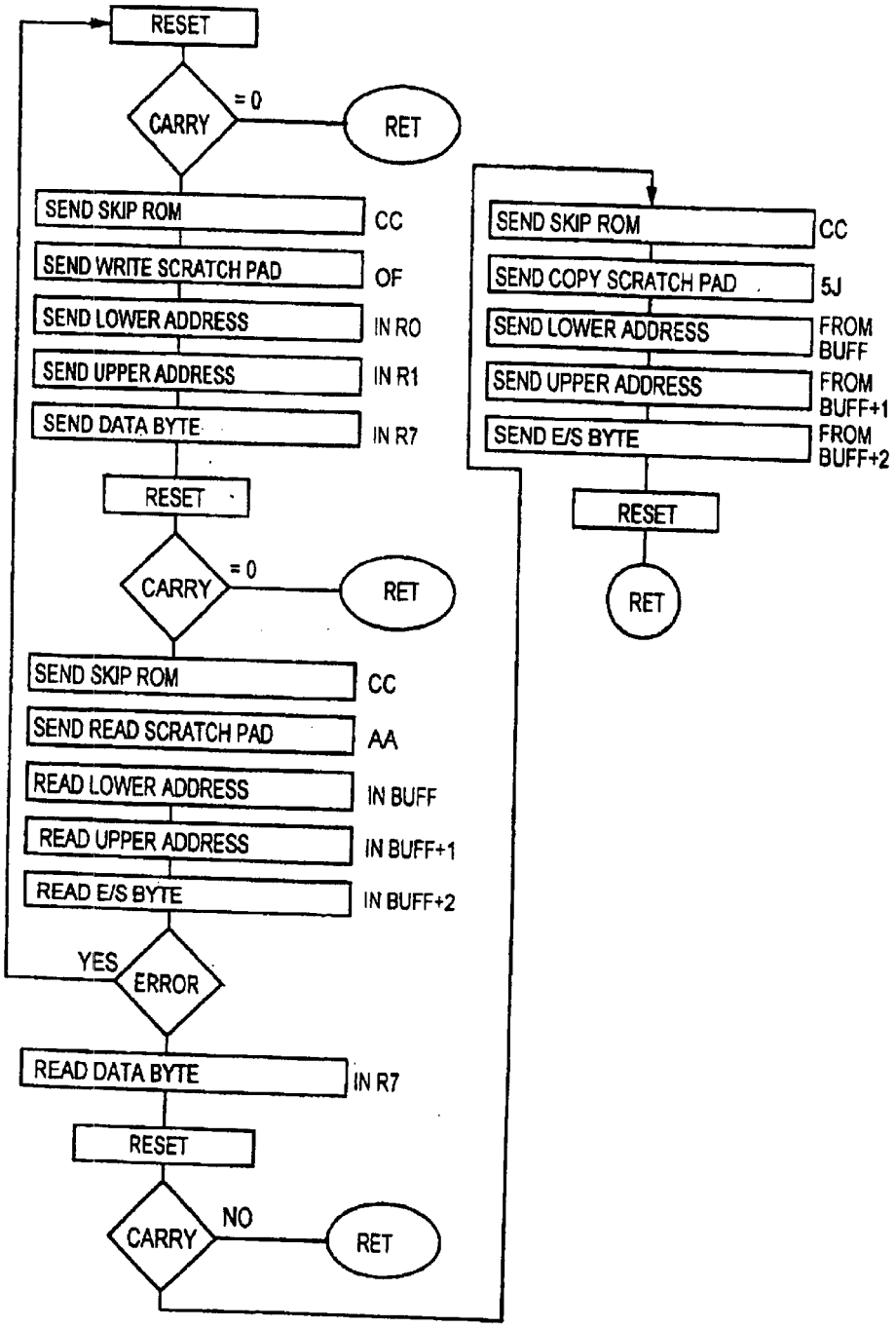
FIG. 3 is a flow chart of write function assembly code according to the present invention.

Referring now to FIG. 3, there is shown the Flow Chart for the Write Function Assembly Code according to the present invention.

In operation or in operational sequence, all components are connected via power-on, and reset switch (POR). The validator or IDS 16 loads the unique serial number of IDA 12 into its local nonvolatile memory and LRC 20 is interrogated by IDS 16 for identification (ID). If LRC 20 has no ID, as in the case of cash collection, the LRC 20 is returned to system and IDS 16 will load the LRC 20 with serial number and the following information:

| | |
|---|---|
| time and date stamp | factory ID |
| validation histogram | manufacture date |
| malfunction summary | IDS configuration |
| CPU revision | cash and coupon accounting data |

The LRC 20 will further be strung with the various reasons for rejection of currency (optically and/or magnetically sensed), i.e. a full stack of bills, channel jams and whatever other data is supplied.

Overall, the inventive system will store:

a) time—stacker was attached;

b) time—stacker was removed;

c) date—stacker was attached;

d) date—stacker was removed;

e) asset number—a serial identification number for the gaming machine;

f) registers for note denominations and running totals;

g) registers for coupon information storage;

h) registers for fault determination and running totals;

i) self-determining mode;

j) providing performance data; and k) flexible data conversion format so data can be displayed on any PC with simple programs.

There are two main components to this system feature. The first is the DS1990A, noted earlier, and the second is the DS2405 Addressable Switch, also noted above. In the DS2250, data is transferred serially via a one-wire protocol. This protocol requires only a single data lead and a ground return. The DS2405 is an open drain N-channel field effect transistor that can be turned on and off to follow the standard Dallas one-wire protocol. This protocol is implemented with a single port of an 8052 microcontroller CPU. Data is transferred to the DS2250 via a stacker connector, and data in binary form is written to the touch memory device as described in the flow chart of the Write Function Assembly Code. The DS2405 Addressable Switch is housed in the cabling assembly so each machine has a unique identification and not the stacker. This provides flexibility for putting any given stacker on any given machine.

Since the memory device is housed within the money stacker or containers, it is easy for a user to retrieve the data. When the stacker is removed and emptied of coins or currency, the data can be retrieved by a fixture and downloaded to a PC, laptop, or handheld data storage device.

Time and data stamps are used for accounting purposes. This information will tell the user when the stackers are accessed and provide detailed information on hourly activity, and thus provide the user with a system for scheduling maintenance, stacker removal, and various other needed activity. According to the present invention, an asset number is assigned to a given gaming machine, i.e., it is the "name" of a given machine. This feature eliminates the need for the user or maintenance personnel to write down which currency stacker or data provider goes to which machine. In the inventive apparatus, since the read/write memory is nonvolatile, the removed stacker does not have to be replaced in the same machine. When a stacker is replaced, the asset number of the machine into which it is placed is written to memory.

The registers set up for bill denominations will keep a running total of how many bills of a particular denomination were inserted. This will give the user an instant tally of the amount of notes in the stacker and the total dollar value contained in the stacker. Other registers are set up to handle bar coded coupons. In this case, the complete encoded bar code number will be stored in memory. This eliminates the need for the user to hand read the coupons into the system because in the inventive technique it can now be downloaded directly from the stacker.

In the inventive implementation, other registers are set up to handle fault counts. More particularly, these registers are set up to handle optical window faults and optical ratio faults, magnetic faults, power faults, stacker faults, unrecognizable bill faults and front-end sensor faults. Such data will give the user insight into how well the machine is performing and which areas need improving. Knowledge of this fault data will also allow the inventive system to warn the user of potential problems. For example, if the machine records an excessive number of faults, it can be programmed to warn the user via network connection or by flashing LED's. The user now has a reliable way systematically to maintain the gaming machine at the highest possible performance level, thus increasing the machine's profit potential.

To ensure the integrity of the data and provide the highest possible level of accuracy, CRC and write verify read procedures are employed in the inventive system.

It is to be understood that in this application use of the terms electrical and data communication are meant to be synonymous—that is, where an element is said to be in electrical communication is can be read as meaning in data communication, and, of course, to those in this art, data communication also includes wireless communication wherein the link can be RF radio frequency), light and infrared, to name a few.

While only a single embodiment of the present invention has been shown and described, it is to be understood that many changes and modifications can be made hereto without departing from the spirit and scope hereof.

What is claimed is:

1. A soft count tracking system for a currency operated host gaming machine comprising:

an identification adapter that includes an integral active electronic component, said component adapted to store a unique serial number, means for placing said identification adapter in data communication with the host machine, a currency note validator with *a* microcontroller, means for placing said currency note validator in data communication with said identification adapter for interrogating the identification adapter for identification number, a storage mechanism that includes integral nonvolatile storage memory means, and means for placing said storage mechanism in data communication with said currency note validator thereby to receive and hold information from said identification adapter, and a soft count supervisor adapted to be placed in detachable data communication with said memory means to interrogate and extract data from the same, said soft count supervisor comprising a computer, including software means to provide spread sheet data manipulation of the data extracted from said memory means.

2. The soft count tracking system according to claim 1, said means for placing said [said] identification adapter in data communication with the host machine including a wiring harness, said active electronic component being disposed in said harness.

3. The soft count tracking system according to claim 2, said active electronic component communicating by means of a one-wire protocol.

4. The soft count tracking system according to claim 3, said wiring harness including means for detachably coupling the same to the host machine.

5. The soft count tracking system according to claim 4, said storage mechanism adapted to stack and securely transport notes and coupons.

6. The soft count tracking system according to claim 3, each of said means for placing said identification adapter, currency note validator and storage mechanism in data communication comprising a harness segment.

7. The soft count tracking system according to claim 6, each of said segments including mating disconnect elements by which a respective segment can be decoupled.

*8. A soft count tracking system for a currency operated host gaming machine, including:*

*a currency note validator to receive currency notes input to the host gaming machine;*

*a first storage memory to store data, the data including a unique identifier corresponding to the host gaming machine;*

*a storage mechanism detachably coupled to said currency note validator to store currency notes received by said currency note validator;*

*a second storage memory associated with said storage mechanism to store data including said unique identifier, said unique identifier being communicated from said first storage memory to said second storage memory; and*

*a soft count supervisor for receiving said storage mechanism and extracting data from said second storage memory.*

*9. The soft count tracking system of claim 8, wherein the soft count supervisor includes a computer, including software means to provide spread sheet data manipulation of the data extracted from said second storage memory.*

*10. The soft count tracking system of claim 8, wherein said first storage memory is coupled to said currency note validator.*

*11. The soft count tracking system of claim 8, wherein said second storage memory is nonvolatile memory.*

*12. The soft count tracking system of claim 8, wherein the soft count supervisor includes a computer, and said storage mechanism is adapted to be detachably coupled to said soft count supervisor to enable data communication therebetween.*

*13. The soft count tracking system of claim 8, wherein said currency notes include money substitutes such as coupons and security papers.*

*14. The soft count tracking system of claim 8, wherein said data to be stored by the second storage memory includes information relating to the currency notes received*

*by said currency note validator, including the number and amount of currency notes received.*

*15. A soft count supervisor for extracting data from a portable storage mechanism, the portable storage mechanism used for storing currency notes input to a gaming machine as well as data associated with the gaming machine, the soft count supervisor comprising:*

*means for placing the soft count supervisor in data communication with said portable storage mechanism; and*

*a computer to extract the data associated with said gaming machine.*

*16. The soft count supervisor of claim 15, wherein said means for placing includes one of an RF, light and infrared communications link.*

*17. The soft count supervisor of claim 15, wherein the data includes a unique identifier associated with said gaming machine.*

*18. The soft count supervisor of claim 15, wherein the data associated with the gaming machine includes information relating to the currency notes received by said currency note validator, including the number and amount of currency notes received.*

*19. The soft count supervisor of claim 17, wherein the data associated with the gaming machine further includes information relating to the currency notes received by said currency note validator, including the number and amount of currency notes received.*

*20. The soft count supervisor of claim 15, wherein the computer includes software means to provide spread sheet data manipulation of the data associated with said gaming machine.*

*21. A soft count tracking system for a currency operated host gaming machine, including:*

*a currency note validator to receive currency notes input to the host gaming machine;*

*a storage mechanism detachably coupled to said currency note validator to store currency notes received by said currency note validator, the storage mechanism including a storage memory to store data associated with said host gaming machine; and*

*a soft count supervisor for receiving said storage mechanism and downloading said data from said second storage memory.*

*22. The soft count tracking system of claim 21, wherein said soft count supervisor includes a computer, including software means to provide spread sheet data manipulation of the data extracted from said second storage memory.*

*23. The soft count tracking system of claim 21, wherein said data includes a unique identifier associated with said host gaming machine.*

*24. The soft count tracking system of claim 23, wherein said data further includes information relating to the currency notes received by said currency note validator, including the number and amount of currency notes received.*

*25. The soft count tracking system of claim 21, further comprising a second storage memory to store data associated with the host gaming machine.*

*26. The soft count tracking system of claim 25, wherein data is transferred from the second storage memory to the storage memory of the storage mechanism.*

* * * * *